July 20, 1943.                M. A. BERNS                2,324,477
                            ICE CREAM DIPPER
                          Filed Feb. 9, 1942
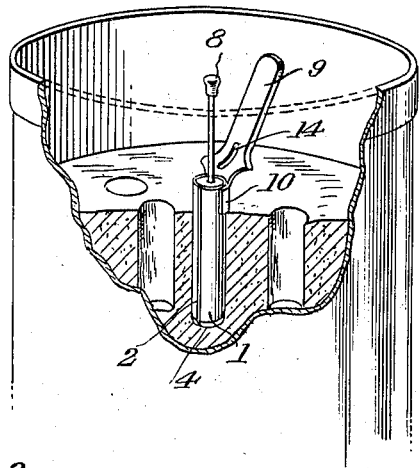
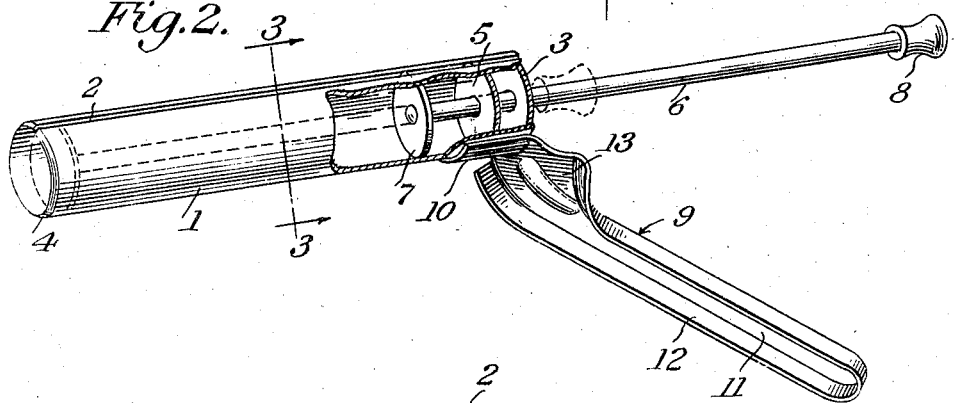
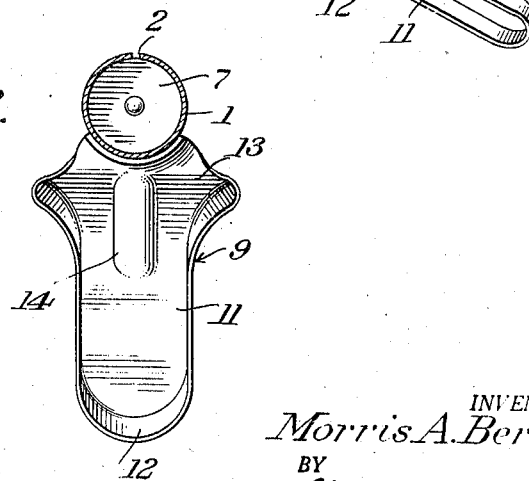
INVENTOR.
Morris A. Berns
BY
Victor J. Evans & Co.
ATTORNEYS Patented July 20, 1943

2,324,477

UNITED STATES PATENT OFFICE 2,324,477

ICE-CREAM DIPPER

Morris A. Berns, Chicago, Ill.

Application February 9, 1942, Serial No. 430,136

3 Claims. (Cl. 107—48)

This invention relates to ice cream dippers, and its general object is to provide a device of that character which is primarily designed for dipping frozen confection or other semisolid material from a container and injecting the dipped portion within a cake bun or the like, the dipper including a cylindrical body to shape the dipped portion accordingly, for said portion to fit a like shaped bore in the bun, with the result it will be seen that my dipper makes it possible to produce a combined cake and ice cream confection which I term a "cake-wich."

A further object is to provide a dipper that can be readily inserted within a mass of frozen confection to fill the body of the dipper, and the contents of the body can be injected within the bun, in an easy and expeditious manner.

Another object is to provide a dipper of the character set forth, that is simple in construction, inexpensive to manufacture, and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a view illustrating the manner in which my device is filled with material or frozen confection within a container.

Figure 2 is a perspective view of the device per se, with the body thereof broken away, and illustrates the plunger withdrawn or in filling position in full lines and in injecting or normal position in dotted lines.

Figure 3 is a sectional view taken approximately on line 3—3 of Figure 2, looking in the direction of the arrows.

Referring to the drawing in detail, it will be noted that the body 1 of my device is of tubular formation to provide a barrel or cylinder, that is preferably made from a single elongated rectangular sheet of metal rolled transversely for disposal of the longitudinal edges thereof in slightly spaced relation to each other to form a relatively narrow slot 2 throughout the length of the body, for the passage of air therefrom, while the body is being filled, so as to prevent the air from being compressed within the body and therefore allowing free passage of the material therein.

One end of the body or cylinder is closed by a disk shaped wall 3 that is fixed thereto and the opposite end is open as well as is provided with a beveled cutting edge 4 to facilitate insertion of the body into the material, for filling the same, as will be apparent upon inspection of Figure 1. The wall 3 has a centrally disposed hole therein and fixed within the body adjacent to the wall is a disk shaped partition 5 which likewise has a centrally disposed hole therein to register with the hole of the wall.

Mounted for sliding movement through the holes of the wall and partition, is a rod 6 of a plunger that includes a disk shaped piston 7 secured to the inner end of the rod, for reciprocation within the body. The partition not only acts as a guide for the plunger, but cooperates with the wall 3 to hold the rod along the longitudinal axis of the body, in order to prevent the piston from binding against the body wall. Secured to the outer end of the rod is a knob-like handle 8 that is not only used for moving the plunger against the contents of the body for ejecting the same therefrom, but contacts the wall 3 to hold the plunger connected to the body. The handle is preferably threaded on the rod to allow removal of the plunger from the body as will be apparent.

In order to facilitate inserting the body into the material, when filling the body, I provide an elongated handle 9 that is preferably made from a single strip of metal to form an arcuate attaching plate 10 that is welded or otherwise fixed to the body along the length thereof and at its closed end. From the attaching portion, the handle 9 extends at a lateral or outward and upward inclined angle from the body, and the angle portion or member 11 is formed with a marginal flange 12, as well as increases in width at its lower end, the wide portion 13 being slightly curved and is formed with an elongated depression or groove 14, along its center, that extends into the angle portion, as best shown in Figure 3. The depression provides a seat for receiving the thumb of the user when the handle 9 is gripped, so as to materially facilitate application of pressure to the device when inserting the body within the material.

From the above description and disclosure in the drawing, it is believed that the use of my device will be obvious, but it might be mentioned that the handle 9 is gripped, with the thumb seated in the groove 14, then the body is forced into the material within the container, as shown in Figure 1. The passage of the material within the body will move the plunger outwardly and when the body is filled, the device is given a slight twisting movement to break the contents or that portion of the material within the body away from that within the container. The contents of the body is then ejected therefrom and into a cake bun, as previously set forth, the bun having a bore therein for receiving the contents, thus it will be seen that my device makes it possible to provide a cake and ice cream confection that can be held in the hand while eating the same.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A dipper for semisolid material, comprising a material receiving cylindrical body slotted longitudinally throughout the length thereof, a wall fixed to and closing one end of the body and the opposite end thereof being open and beveled to provide a cutting edge, a partition fixed within said body and spaced from said wall, a plunger including a handled rod mounted for slidable movement through the partition and said wall to be guided thereby, a piston secured to the inner end of the rod for reciprocation within the body, and a handle secured to the body at the closed end thereof and extending at a lateral and upward inclination therefrom.

2. A dipper for semisolid material, comprising a material receiving cylindrical body slotted longitudinally throughout the length thereof, a wall fixed to and closing one end of the body and the opposite end thereof being open and beveled to provide a cutting edge throughout the periphery thereof, a partition fixed within said body and spaced from said wall, a plunger including a rod mounted for slidable movement through the partition and said wall to be guided thereby, a piston secured to the inner end of the rod for reciprocation within the body, a handle including an arcuate attaching plate fixed to the body at the closed end thereof, an elongated hand gripping member formed on the plate and extending therefrom at a lateral and upward inclination, and said member having a curved lower end portion provided with a thumb receiving seat.

3. A dipper for semisolid material, comprising a material receiving cylindrical body slotted longitudinally throughout the length thereof, a wall fixed to and closing one end of the body and the opposite end thereof being open and beveled to provide a cutting edge, a partition fixed within said body and spaced from said wall, a handled plunger including a rod mounted for slidable movement through the partition and said wall to be guided thereby, a disk shaped piston secured to the inner end of the rod for reciprocation within the body, a handle including an arcuate attaching plate fixed to the body at the closed end thereof, an elongated hand gripping member formed on the plate and extending therefrom at a lateral and upward inclination, said member having a relatively wide curved lower end portion provided with an elongated thumb receiveing slot along the longitudinal center thereof, and a downturned marginal flange on said member.

MORRIS A. BERNS.